(No Model.) 4 Sheets—Sheet 1.
C. B. SCHUMANN.
COMBINED EXTENSION LADDER, FIRE ESCAPE, AND HOSE CARRIAGE.
No. 381,587. Patented Apr. 24, 1888.
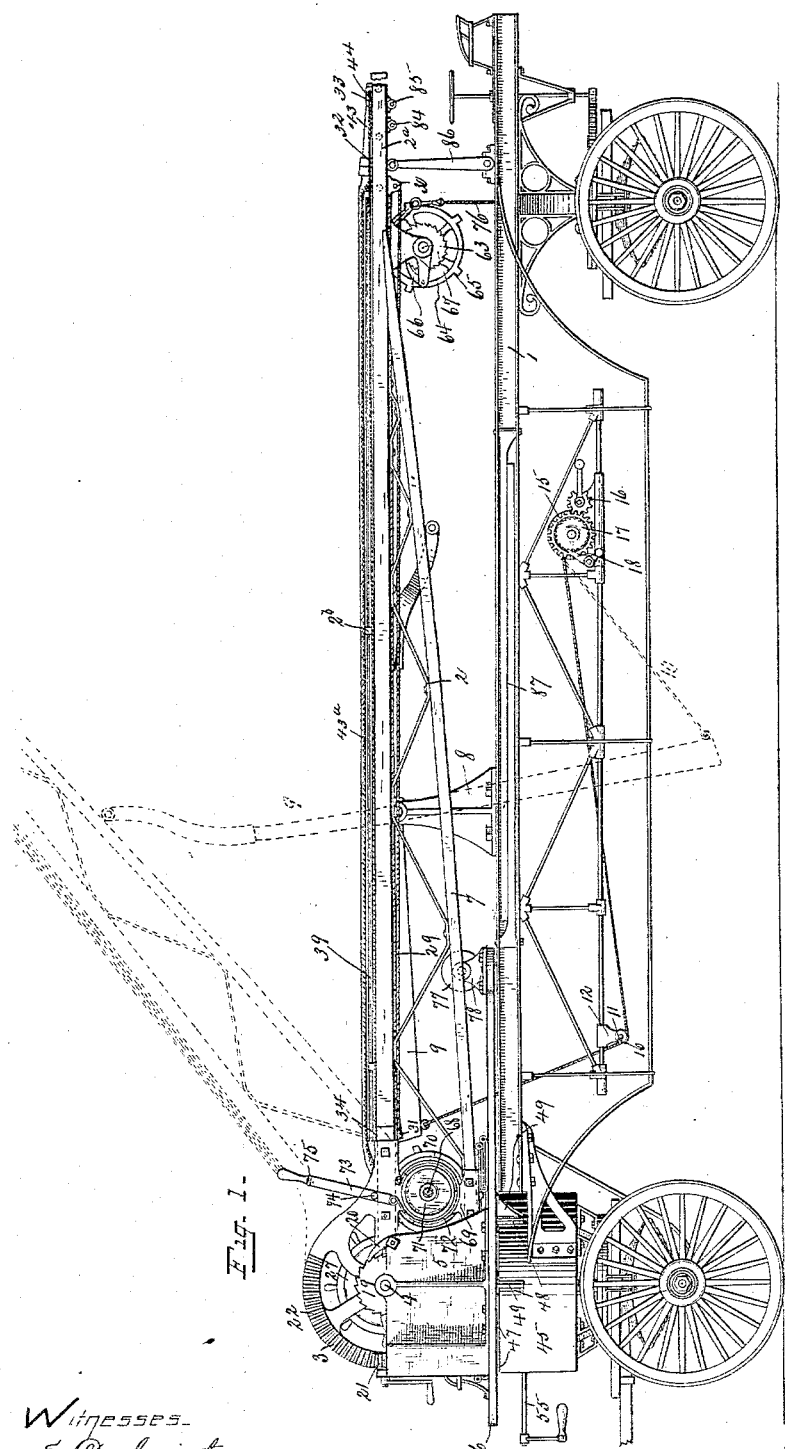

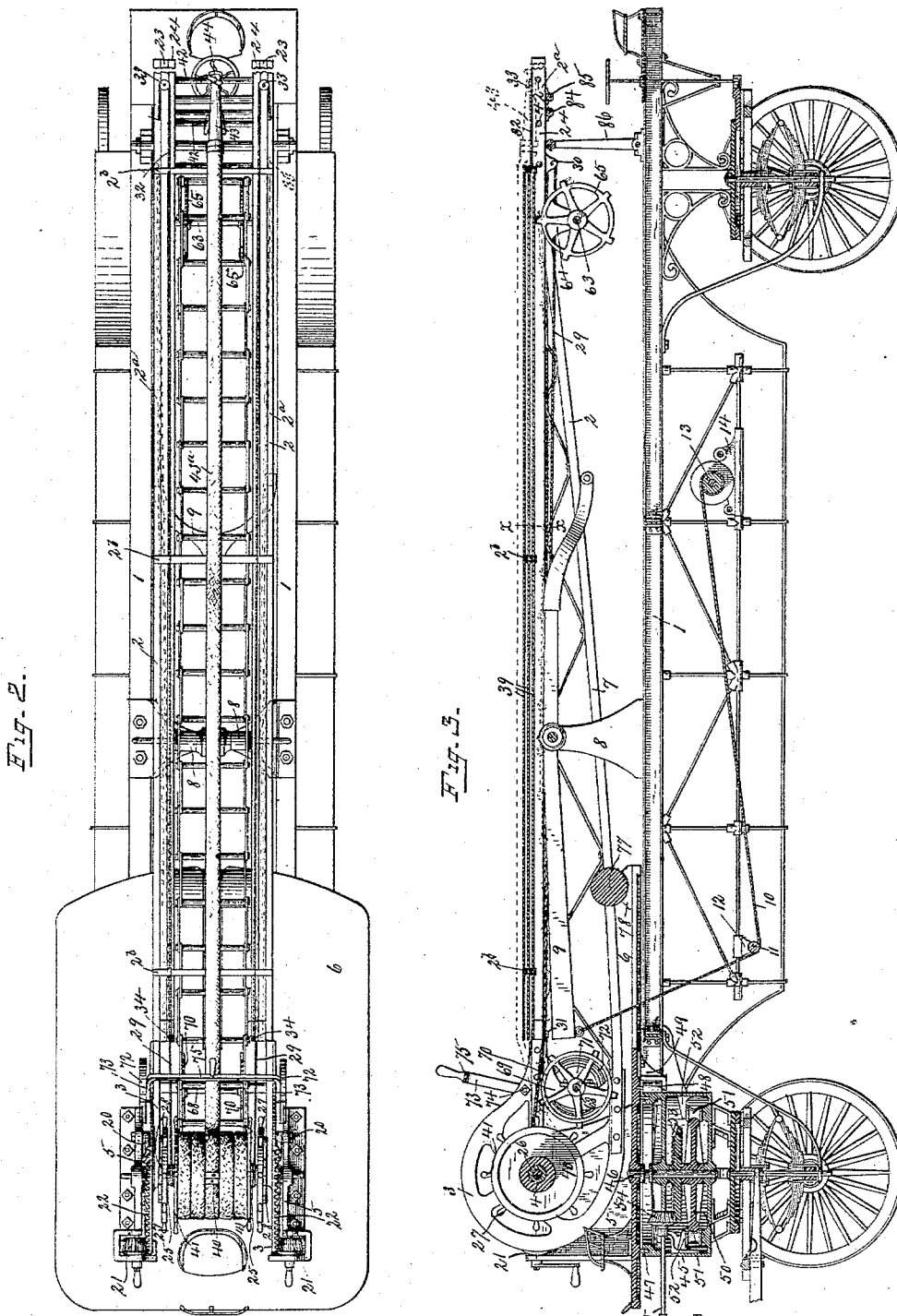

(No Model.) 4 Sheets—Sheet 3.
C. B. SCHUMANN.
COMBINED EXTENSION LADDER, FIRE ESCAPE, AND HOSE CARRIAGE.
No. 381,587. Patented Apr. 24, 1888.
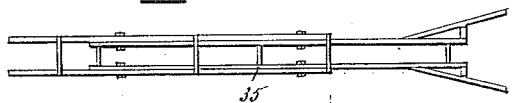
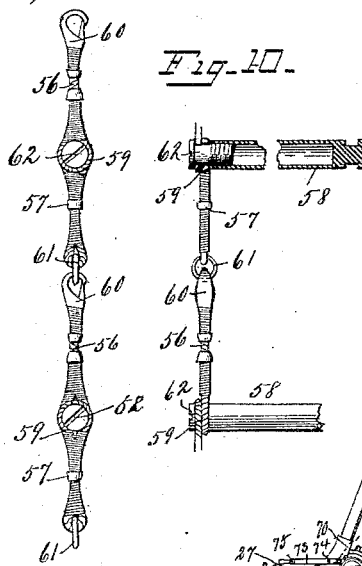
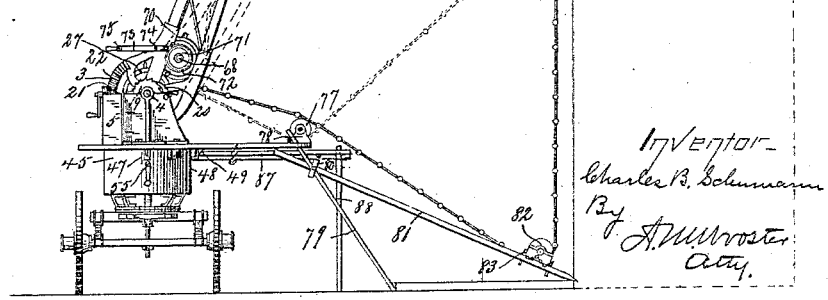

(No Model.) 4 Sheets—Sheet 4.
C. B. SCHUMANN.
COMBINED EXTENSION LADDER, FIRE ESCAPE, AND HOSE CARRIAGE.
No. 381,587. Patented Apr. 24, 1888.
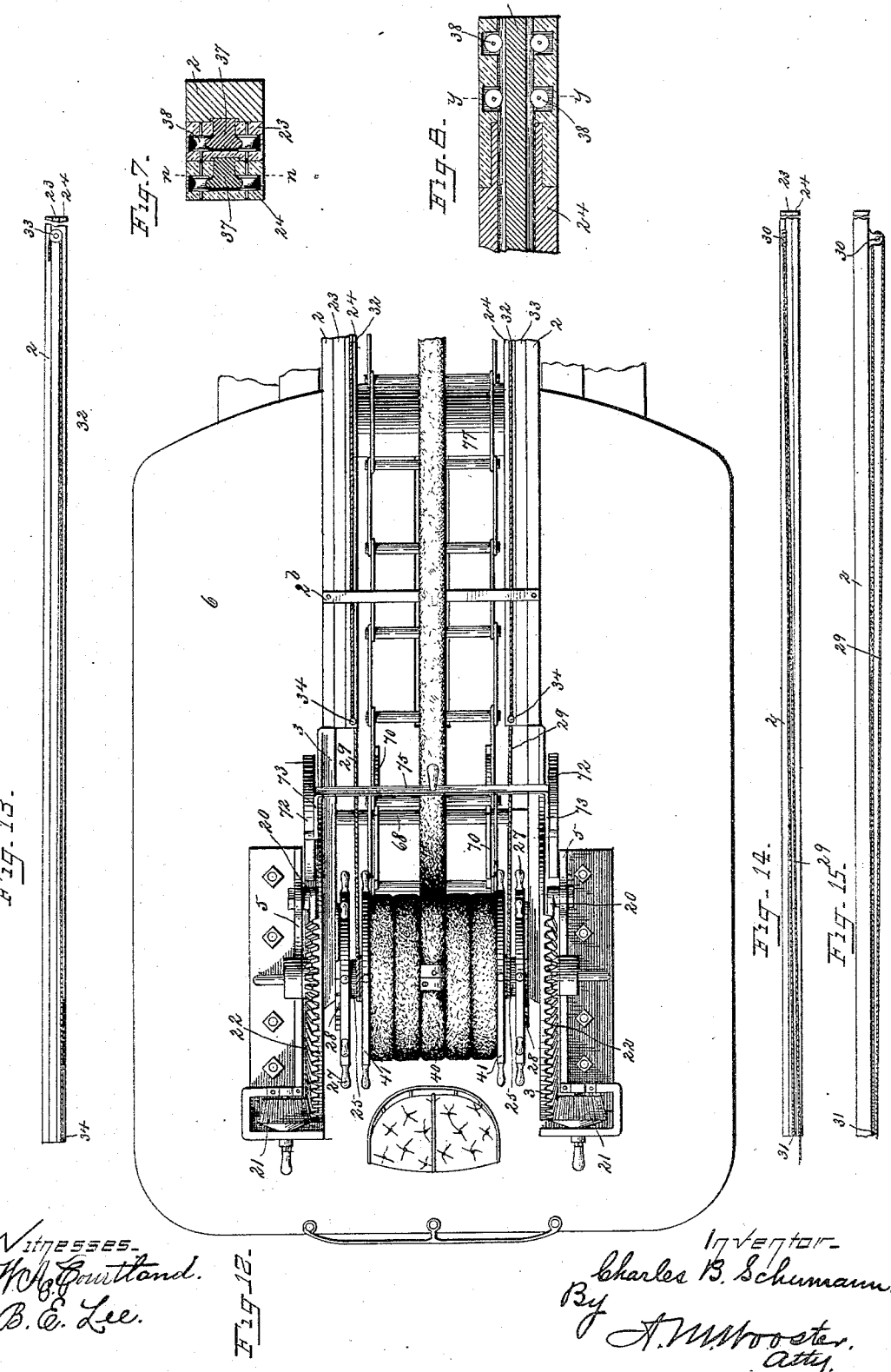

UNITED STATES PATENT OFFICE.

CHARLES B. SCHUMANN, OF SOUTH NORWALK, CONNECTICUT.

COMBINED EXTENSION-LADDER, FIRE-ESCAPE, AND HOSE-CARRIAGE.

SPECIFICATION forming part of Letters Patent No. 381,587, dated April 24, 1888.

Application filed October 17, 1887. Serial No. 252,580. (No model.)

*To all whom it may concern:*

Be it known that I, CHARLES B. SCHUMANN, a citizen of the United States, residing at South Norwalk, in the county of Fairfield and State of Connecticut, have invented certain new and useful Improvements in a Combined Extension-Ladder, Fire-Escape, and Hose-Carriage; and I do hereby declare the following to be a full, clear, and exact description of the invention, such as will enable others skilled in the art to which it appertains to make and use the same.

My invention has for its object to combine in a single machine for use at fires the functions of an adjustable extension-ladder, a fire-escape, and a hose-carriage.

With these ends in view I have devised the novel construction of which the following description, in connection with the accompanying drawings, is a specification, numbers being used to denote the several parts.

Figure 1 is side elevation of the device complete and ready for use, the ladder carrier being shown in dotted lines in a partially-raised position; Fig. 2, a plan view; Fig. 3, a longitudinal section; Fig. 4, an end elevation showing the slides extended and the fire-escape in use, another position being shown in dotted lines; Fig. 5, a detail plan view of the turning mechanism, the table being removed; Fig. 6, a detail sectional view on the line $x\ x$ in Fig. 3; Fig. 7, a cross-section of the ladder-carrier and slides on the line $y\ y$ in Fig. 8; Fig. 8, a longitudinal section at the inner end of one of the slides on the line $u\ u$ in Fig. 7, the slide being reversed; Fig. 9, an enlarged side elevation; and Fig. 10 a front elevation, partly in section, of a portion of the ladder. Fig. 11 is a plan view of a sliding brace to be used under certain circumstances—for example, when the fire escape is used upon a building having a porch, as shown in dotted lines in Fig. 4; Fig. 12, an enlarged plan view of the table and the operative parts carried thereby; and Figs. 13, 14, and 15 are detail views illustrating the arrangement of the lifting-ropes.

1 denotes frame work of any suitable construction.

2 denotes the ladder-carrier, which consists, essentially, of side pieces, $2^a$, connected by cross-pieces $2^b$.

3 denotes castings, approximately circular in form, which are rigidly secured to or made integral with a shaft, 4, journaled in brackets 5 on opposite sides of the table, which is denoted by 6.

7 denotes a double brace for imparting rigidity to the ladder-carrier, the lower or inner ends of which are rigidly bolted to the lower side of casting 3, as is clearly shown in Fig. 1.

8 denotes brackets bolted on opposite sides of the frame-work, and 9 a lifting-lever pivoted between said brackets about midway its length. The forward end of this lever is bifurcated, as shown in Fig. 2, and its ends are provided with rollers bearing upon the under sides of double brace 7.

10 is a rope or chain, preferably a wire rope, one end of which is secured to the inner end of the lifting-lever, passing thence under a roller, 11, journaled between brackets 12 on opposite sides of the frame-work. The opposite end of this rope is attached to a winding-drum, 13, journaled in brackets 14 on opposite sides of the frame-work. One or both ends of the shaft of the drum are provided with gear-wheels 15, engaged by a pinion or pinions, 16, operated by a crank or in any suitable manner. A ratchet, 17, is also provided upon the shaft, which is engaged by a pawl, 18, to lock the parts in any desired position.

When it is desired to raise the ladder-carrier, the first portion of the operation is accomplished by winding rope 10 upon drum 13 until the inner end of lifting-lever 9 is drawn nearly down to roller 11. It should be noticed that in addition to the pawl 18 and ratchet 17, which prevent backward movement of rope 10, ratchets 19 are provided near the opposite ends of shaft 4, one only being shown. Pawls 20 engage these ratchets and lock the ladder-carrier at any point to which it has been raised. When the parts are in this position, rope 10 is slackened slightly by lifting pawl 18, and roller 11 is removed. This allows lifting-lever 9 to be swung to the position shown in dotted lines in Fig. 1 by continued winding of rope 10 upon the drum, which raises the ladder-carrier to the position also shown in dotted lines in said figure. The object of this portion of my invention is to apply the lifting-power to the ladder-carrier at the moment of the greatest strain—that is, in starting it, at a distance from its fulcrum—so that I am enabled to exert great lifting-power with little expenditure of force. Should it be desired to raise the ladder-carrier still higher—that is, more nearly to the vertical plane—it is accomplished by means of winding-pinions 21, which engage circular racks 22 on castings 3. This construction allows me to raise the ladder carrier to a vertical position, if necessary.

In order to give additional length to the ladder carrier, so that the ladder proper, which I shall presently describe, may be carried to any desired height within reasonable limits, I provide a suitable number of slides capable of being extended to form a continuation of the ladder-carrier. In the present instance, for convenience in illustration, I have shown two slides only, which are designated by 23 and 24. These slides consist in practice simply of side pieces supported and made rigid by cross-pieces. They are both constructed in substantially the same manner as the ladder-carrier. The first slide lies just within the side pieces of the ladder-carrier, and the second slide just within the side pieces of the first. Having raised the ladder-carrier to the desired angle, the required height for the ladder-support is secured in the manner I will now describe.

25 denotes winding-drums carried by a shaft, 26, concentric with shaft 4. These drums are operated by hand-wheels 27, and their backward movement is checked by pawls engaging ratchets 28, made rigid with the drums.

29 denotes ropes or chains, preferably wire ropes, one end of each being attached to one of the drums. These ropes extend forward and pass around pulleys 30 at the forward end of the ladder-carrier, thence backward again, and are attached to the inner end of the first slide at the point on each side denoted by 31.

32 denotes similar ropes or chains, one end of each being attached near the outer end of the ladder-carrier and passing thence forward and around pulleys 33 at the outer end of slide 23; thence inward again, the other ends being connected to the inner end of slide 24 at the point denoted by 34. In order to throw out the slides, shaft 26 is rotated by means of the hand-wheels winding ropes 29 upon the drums and throwing out slide 23, slide 24 being at the same time projected beyond slide 23 by means of ropes 32, which pass around pulleys 33, and are connected to the inner end of slide 24, the outward movement of slide 24 being of course just twice as great as the movement of slide 23.

35 (see Fig. 11) is an adjustable brace which may be used as an additional support for the ladder-carrier in the manner indicated in dotted lines in Fig. 4, and is especially important under certain circumstances when the device is used as a fire-escape, as will be more fully explained.

The line 36 in Fig. 4 indicates the side of a high building against which the ladder is resting.

The details of construction of the ladder-carrier and slides are clearly illustrated in Figs. 6, 7, and 8. The slides are connected to the ladder-carrier and to each other by metallic dovetails 37, engaging corresponding grooves. In order to lessen the friction, especially at the inner ends of the slides, I provide rollers 38, which engage the flanges of the dovetails, as clearly shown in Figs. 7 and 8.

39 denotes longitudinal strips secured to the cross-pieces of both ladder-carrier and slides, which serve as a support for the hose, as will presently be explained.

40 denotes the hose reel or drum, which is journaled upon shaft 26. This drum is provided with handles 41, for convenience in winding.

At the outer end of slide 24 I preferably provide a number of cross-pieces or rungs, 42, upon which a fireman may stand when the machine is in use, and to which the nozzle 43 is attached when the machine is not in use by a catch, as indicated at 44 in Fig. 2, the hose being denoted by 43ª. In use the table may be rotated to place the ladder in any desired position by means of mechanism contained in a housing, 45, said mechanism being clearly illustrated in Fig. 3.

46 denotes a vertical shaft, which is suitably supported in the housing, and to which the table is rigidly attached.

47 denotes rollers in the top of the housing upon which the table rests.

48 denotes rollers journaled in brackets 49 on the under side of the table, which bear against the housing as the table is turned.

50 is a supporting-wheel rigidly secured to shaft 46, which bears against rollers 51, journaled in suitable brackets, 52, within the housing.

53 is a beveled gear upon shaft 46, which is engaged by a beveled pinion, 54, on crank-shaft 55. In order to turn the table in either direction, it is simply necessary to rotate crank-shaft 55. In use the ladder carrier is ordinarily raised first, then the table is turned to place the carrier in the desired position relatively to the wall of the building, and then the slides are extended. The table may be turned, however, in either direction with perfect safety when the slides are extended.

The ladder is made up of independent parts 56 and 57 and cross-pieces or rungs 58. Parts 56 and 57 are made in any suitable manner, ordinarily of metal strengthened by wire. Each piece is provided at one end with an eye or loop, 59, parts 56 being provided at their opposite ends with snap hooks 60, and parts 57 being provided at their opposite ends with rings 61. The rungs or cross-pieces are preferably made hollow, and are screw-threaded at their opposite ends. The parts of the ladder are held together by means of screws 62, each of which passes through the loop of a part, 56, and a part, 57, and engages one end of the rung, as clearly shown in Fig. 10. The ladder is then completed by engaging each hook 60 with one of the rings 61, as clearly shown in Fig. 10.

It will of course be understood that any ordinary or preferred style of flexible ladder may be used in connection with my novel ladder-carrier and extension-slides, although I preferably use my improved ladder as just described.

63 denotes a shaft journaled in brackets 64 depending from slide 24. This shaft carries sprocket-wheels 65, which are engaged by the rungs or cross-pieces of the chain. The sprocket-wheels are held against backward movement by pawls and ratchets 66 and 67. (Shown on one side in Fig. 1.)

68 denotes a similar shaft journaled in brackets 69 at the inner end of the ladder-carrier. 70 denotes sprocket-wheels similar to wheels 65 carried by this shaft.

71 denotes pulleys on opposite sides of the machine on shaft 68, and 72 friction-straps adapted to engage these wheels and held in contact therewith by levers 73, suitably pivoted to the ladder-carrier, as at 74. These levers are preferably connected by a cross-piece, 75, which is provided with handles for convenience in operation. When not in use, the outer end of the ladder is engaged upon sprocket-wheels 65. The inner end passes over sprocket-wheel 70 and lies coiled under castings 3, between brackets 5, the ends of the folded links being shown clearly in Fig. 1, sufficient chain being of course carried with each machine to meet any possible emergency.

In use at a fire the ladder-carrier is first raised, then the table is ordinarily turned, if necessary, to place it in position, and the slides then extended to give the desired height to the ladder, the outer end of the ladder being still connected to sprocket-wheels 65. If the ladder is required for the ascent and descent of firemen only in managing the hose, it is already in place as soon as the ladder-carrier is raised and turned to place; or, if preferred, the end of the ladder may be drawn down by rope 76, (see Fig. 1,) one end of which is attached to the outer end of the ladder and the other end coiled upon the frame-work. When the end of the ladder to which the rope is attached has been drawn down, it is connected to the opposite end by means of the hooks and rings, thus making a continuous or double ladder.

When it is desired to use the ladder as a fire-escape, it is drawn under roller 77, journaled in brackets 78 upon the table and connected as before. It will of course be understood that pawls and ratchets 66 and 67 hold the ladder against backward movement, but permit it to move forward readily. When used as a fire-escape, the person or persons who wish to descend simply have to place themselves upon the outer portion of the double ladder and travel downward with it to the ground, the movement being controlled by levers 73 and the straps engaging pulleys 71. This is an important feature, as it does away with all necessity for climbing on the part of the person using the fire-escape. A firm footing is provided, and it is simply necessary to hold on and travel downward with the ladder. Pulleys 71 are made large, and the straps, which are of course of metal, broad enough so that by means of the friction upon the pulleys the rapidity of the descent is wholly within the control of the firemen operating the machine.

In order to give a more nearly vertical line of descent, if necessary, when the ladder is used as a fire-escape, I provide a brace, 79, the outer end of which engages the curbing, as indicated in Fig. 4, and the inner end engages table 6. This brace carries a sliding block, 80, adjusted by a set-screw.

81 denotes another brace, the outer end of which rests against the building itself or any suitable solid object, as indicated in Fig. 4, the inner end passing through block 80 and secured there by a set screw or in any suitable manner.

82 denotes a roller journaled in bearings 83, which slide on brace 81, and are locked in any desired position by pins or in any suitable manner.

When the device is used as a fire-escape upon high buildings, where it is desirable that the descent should be as nearly vertical as possible, the ladder is passed under roller 82 and over roller 77, and is then connected to the opposite end, as before, the ladder being made continuous whenever the device is used as a fire-escape, it being of course understood that the ladder may be lengthened or shortened, as may be required, almost instantly by connecting or disconnecting parts by means of the snap-hooks and rings. When the slides have been extended and it is desired to return them to their normal position, the pawls are lifted from ratchets 28, and drums 25 are turned backward, which unwinds ropes 29, thus allowing the slides to move inward. Should the slides stick or bind from any cause, they may be readily drawn inward by affixing the crank to shaft 68 and turning it backward. This will cause sprocket-wheels 70 to draw the ladder inward, and as the outer end of the ladder is firmly connected to sprocket-wheels 65 upon slide 24, which are held against backward movement, it follows that both slides must be drawn inward thereby. In order to reduce the friction to the minimum in moving the slides in and out, and to provide an additional support for the slides to prevent displacement, I provide an anti-friction roller, 84, upon the ladder carrier, over which slide 23 passes, and a similar roller, 85, upon slide 23, over which slide 24 passes. Having returned the slides to their normal position, the carriage is turned so as to place the ladder-carrier in proper position parallel with the frame work. The ladder-carrier may then be lowered to about the position indicated in dotted lines in Fig. 1 by means of pinions 21 engaging racks 22, cranks being provided by which to operate the pinions. Having reached the position shown in dotted lines, the ladder-carrier is lowered until it rests upon a support, 86, by lifting pawl 18 from ratchet 17 and turning drum 13 backward, so as to unwind rope 10. As shown in the drawings, support 86 is preferably made to fold down upon the frame-work when the machine is in use, so as to be wholly out of the way.

87 denotes arms hinged to fold under the side of the frame-work, which may be used in connection with a vertical bar, 88, to form a side support to hold the machine steady when the slides are extended and the fire-escape in use, as shown in Fig. 4. Arms 87 are swung out until their outer ends just cross, and the vertical bar is passed through corresponding openings at the ends of the bars, a shoulder (not shown) being provided on the bar, which is thus made to support any weight that can possibly be thrown upon it, and upsetting of the machine is rendered practically impossible.

It will of course be understood that I do not limit myself to the exact details of construction shown and described, as they may obviously be greatly varied without departing from the principle of my invention.

I claim—

1. The combination, with the ladder-carrier, the lifting-lever, rope 10, and the winding-drum, of castings 3, to which the ladder-carrier is attached, and which are provided with racks 22, and winding-pinions engaging said racks, whereby the ladder-carrier may be raised to any desired position, substantially as described.

2. The combination, with the ladder carrier, the lifting-lever, rope 10, the winding-drum, and roller 11, of castings 3, to which the ladder-carrier is attached, and which are provided with racks 22, and winding-pinions engaging said racks, substantially as described.

3. The combination, with the ladder-carrier, the lifting-lever, rope 10, and the winding-drum, of castings 3, to which the ladder-carrier is attached, and which are provided with racks 22, winding-pinions engaging said racks, and pawls and ratchets, whereby backward movement of the ladder-carrier is prevented, substantially as described.

4. The combination, with castings 3, having racks, winding-pinions engaging said racks, the ladder-carrier secured to the castings, and lifting mechanism, substantially as described, of slides 23 and 24, winding-drums 25, ropes extending from said drums passing over pulleys and connected to the rear end of slide 23, and ropes 32, one end of each of which is connected to the ladder-carrier, passes thence over a pulley on slide 23, and is connected to the rear end of slide 24, whereby when ropes 29 are wound said slides are extended.

5. The combination, with castings 3, lifting mechanism, substantially as described, and brace 7, of slides 23 and 24, ropes 29 and 32, and winding-drums 25.

6. Shaft 4, castings 3, rigidly attached thereto, and the ladder-carrier secured to the castings, in combination with slides 23 and 24, ropes 29 and 32 for extending said slides, shaft 26, carrying winding-drums 25 for ropes 29, and a hose-reel journaled on shaft 26.

7. The ladder-carrier and slides 23 and 24, in combination with sprocket-wheels 65, journaled at the outer end of slide 24, sprocket-wheels 70, journaled at the inner end of the ladder-carrier, and a flexible ladder carried by said sprocket-wheels.

8. The combination, with the ladder-carrier and slides 23 and 24, of sprocket-wheels 65 and 70, a flexible ladder, and a rope, 76, connected to the outer end of the ladder, as and for the purpose set forth.

9. The table, shaft 46, gear-wheel 53, and supporting-wheel 50, in combination with pinion 54 and rollers 51, against which the supporting-wheel bears.

10. The table, shaft 46, and gear 53, in combination with housing 45, rollers 47, upon which the table rests, and rollers 48, carried by the table, which bear against the outer side of the housing.

11. The housing having rollers 47 and 51, in combination with shaft 46, carrying the table and having gear-wheel 53, and supporting-wheel 50, engaging rollers 51, and a pinion, 54, engaging the gear-wheel.

12. The combination, with the ladder-carrier and slides 23 and 24, of dovetails 37 on the ladder-carrier, and slide 23, and grooves in both slides having rollers 38, which engage the dovetails, and ropes 29 and 32, arranged as described, whereby the slides are extended.

13. The combination, with the ladder-carrier having cross-pieces 2$^b$, of the hose-reel and hose and longitudinal strips 39, secured to the cross-pieces by which the hose is supported.

14. The combination, with the ladder-carrier, slides 23 and 24, and ropes 29 and 32, by which they are extended, of sprocket-wheels 65 and 70, pawls and ratchets to hold wheels 65 against backward movement, and a flexible ladder carried by said sprocket-wheels, whereby when sprocket-wheels 70 are turned backward the ladder may be drawn inward to return the slides to their normal position.

15. The ladder-carrier and slides 23 and 24, in combination with sprocket-wheels at the outer end of slide 24, sprocket-wheels at the inner end of the ladder-carrier, a continuous chain carried by said sprocket-wheels and friction-pulleys 71, and straps 72, whereby the movement of the chain is controlled when used as a fire-escape.

16. The ladder-carrier, slides 23 and 24, and ropes 29 and 32, in combination with sprocket-wheels 65 and 70, an endless ladder passing over said sprocket-wheels, a pawl and ratchet to prevent backward movement, friction-pulleys upon the shaft of wheels 70, straps engaging said pulleys, and levers to operate the straps to control the movement of the ladder.

17. The ladder-carrier, slides, and sprocket-wheels, in combination with an endless ladder carried by the sprocket-wheels, braces 79 and 81, and rollers 77 and 82.

18. The combination, with the table, ladder-carrier, and slides, of an endless ladder, sprocket-wheels by which it is carried, pawls and ratchets for preventing backward movement, friction-pulleys and straps for controlling the forward movement, and pulleys 77 and 82, for guiding the ladder.

19. The combination, with the table, ladder-carrier, slides, and endless ladder, of brace 79, secured to the table and carrying sliding block 80, brace 81, engaging said block, and a roller, 82, carried by sliding bearings 83 upon said brace, over which the ladder passes, substantially as described.

20. The combination, with the table, ladder-carrier, and slides, of an endless ladder and a brace, 35, for supporting the parts in use.

21. The ladder-carrier, rack, pinion, and lifting-lever for raising it, the slides having rollers 38, and the sprocket-wheels, in combination with an endless ladder carried by the sprocket-wheels, and pawls, ratchets, and friction-straps, whereby its movement is controlled when used as a fire-escape.

22. The table, ladder-carrier, slides, and ladder, in combination with the lifting-lever, rope 10, and racks and pinions for raising the ladder, and a pinion and gear for rotating the table, substantially as described.

23. Shaft 4, the ladder-carrier, slides, and ladder, in combination with the lifting-lever, rope 10, winding-drum 13, a pawl and ratchet to prevent backward movement of said drum, racks 22 on shaft 4, pinions engaging them, and racks and pinions to hold said shaft against backward movement.

24. The table and a rack and pinion for turning it, and the ladder-carrier journaled on said table, in combination with a lifting-lever and rope, and racks and pinions for raising the ladder-carrier, substantially as described.

In testimony whereof I affix my signature in presence of two witnesses.

CHARLES B. SCHUMANN.

Witnesses:
A. M. WOOSTER,
B. E. LEE.